Patented Oct. 13, 1953

2,655,507

UNITED STATES PATENT OFFICE 2,655,507

PYRAZOLE COMPOUNDS

Reuben G. Jones, Indianapolis, Ind., assignor to Eli Lilly and Company, Indianapolis, Ind., a corporation of Indiana No Drawing. Original application November 10, 1950, Serial No. 196,093. Divided and this application August 6, 1952, Serial No. 302,999

5 Claims. (Cl. 260—310)

This invention relates to 3-hydroxymethylpyrazole and its acid addition salts.

The base of the novel compounds of this invention can be represented by the formula

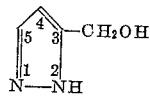

It should be noted that two isomeric forms of the pyrazole compounds exist because of a dynamic equilibrium. Thus, the compound can be represented by either of the following formulas:

Formula A        Formula B

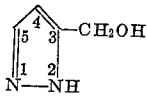   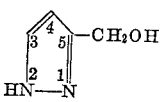

The two forms of the pyrazole compounds as represented by the given formulas are equivalent, and both are within the scope of this invention. For the purpose of convenience, the form of Formula A will be employed exclusively in this specification and the appended claims.

The novel pyrazole base of this invention is a liquid at ordinary temperatures.

Because of the basic nitrogen atom in the pyrazole ring, hydroxymethylpyrazole readily forms acid addition salts, and these salts are included within the scope of the invention. The salts are readily prepared by methods commonly employed for preparing acid addition salts of organic bases. Suitable methods include the reaction of the stoichiometric equivalent of the desired acid with the desired free base in a mutual solvent, followed by evaporation of the solvent; the displacement of the acid of an acid addition salt of the desired base by another acid; and the like. Examples of acids useful for the purpose of forming salts with the novel bases include inorganic acids such as hydrochloric, hydrobromic, hydriodic, sulfuric, nitric, sulfamic, and phosphoric acids, and organic acids such as picric, acetic, maleic, tartaric, succinic, benzoic, lactic and salicylic acids.

3-hydroxymethylpyrazole is a relatively nontoxic mild analgesic, and has emulsifying properties.

This application is a division of my prior copending application Ser. No. 196,093, filed November 10, 1950.

The following specific examples further illustrate this invention.

EXAMPLE 1

*3-hydroxymethylpyrazole*

28 g. of ethyl 3-pyrazolecarboxylate, prepared by the esterification of 3-pyrazolecarboxylic acid (Knorr, Ann. 279, 231, 1894) with ethanol and hydrogen chloride, were placed in a Soxhlet thimble above a refluxing solution of 15 g. of lithium aluminum hydride in 1 liter of ether. Refluxing was continued for about 15 hours, at which time all of the ester had been extracted from the thimble and had been carried down into the lithium aluminum hydride solution. 50 cc. of water were added cautiously and with stirring to the reaction mixture to decompose excess lithium aluminum hydride, and the ether was evaporated. From the residue, a white, granular material, the 3-hydroxymethylpyrazole was isolated as follows: 300 cc. of methanol were added to the residue and the mixture was thoroughly saturated with carbon dioxide. The mixture was then heated to boiling and filtered, and the residue from filtration was reextracted with two additional 300 cc. portions of boiling methanol. The methanol filtrates containing the 3-hydroxymethylpyrazole were combined, and evaporated in vacuo. The residue of 3-hydroxymethylpyrazole which contained a small amount of solid material, was extracted with 50 cc. of dry methanol. The methanol solution was filtered, the filtrate was evaporated, and the residual syrup was distilled in vacuo yielding the 3-hydroxymethylpyrazole in substantially pure form.

3-hydroxymethylpyrazole thus prepared boiled at about 137–140° C. at a pressure of 0.5 mm. of mercury, and had $n_D^{25}$ 1.5340 and $$d_{25}^{25}\ 1.225$$

Analysis showed the presence of 28.42 percent nitrogen as compared with the calculated amount of 28.50 percent.

EXAMPLE 2

*3-hydroxymethylpyrazole hydrochloride*

To an anhydrous diazomethane solution prepared in 1.5 liters of ether from 103 g. (1 mol) of nitrosomethylurea were added 56 g. (1.0 mol) of freshly distilled propargyl alcohol. The solution was allowed to stand at room temperature for about 60 hours, the ether was evaporated, and the syrupy residue was fractionally distilled in vacuo. The fraction boiling from about 120° C. to about 150° C. at a pressure of 0.5 mm. of mercury was collected. The viscous liquid consisting of crude 3-hydroxymethylpyrazole was dissolved in 50 cc. of water, and added to a solution of 80 g. of picric acid in 1200 cc. of water at 100° C. The mixture was boiled with 5 g. of decolorizing carbon, filtered and cooled to about 40° C., whereupon a yellow crystalline precipitate of 3- hydroxymethylpyrazole picrate formed. The precipitate was filtered off, washed with absolute ethanol and dried.

3-hydroxymethylpyrazole picrate thus prepared melted at 183.5–184.5° C. Analysis showed the presence of 21.43 percent of nitrogen as compared with the calculated amount of 21.44 percent.

75 g. of 3-hydroxymethylpyrazole picrate were suspended in 200 cc. of nitrobenzene, and the mixture was extracted with 50 cc. of 12 N hydrochloric acid. The hydrochloric acid layer was removed and washed with three 50 cc. portions of chloroform to recover any undecomposed picrate. The nitrobenzene and the chloroform washings were combined and again extracted with a fresh 50 cc. portion of 12 N hydrochloric acid. The combined acid extracts were filtered, and the filtrate was evaporated to dryness in vacuo. The residue, comprising 3-hydroxymethylpyrazole hydrochloride, was dissolved in absolute ethanol, and the solution evaporated to dryness in vacuo. 3-hydroxymethylpyrazole hydrochloride was obtained in the form of a very hygroscopic, white, crystalline solid. After recrystallization from absolute alcohol-ether mixture, the 3-hydroxymethylpyrazole hydrochloride melted at 117–118° C.

EXAMPLE 3

3-hydroxymethylpyrazole sulfate 19.6 g. (0.2 mol) of 3-hydroxymethylpyrazole were dissolved in 50 cc. of ethanol, and a solution of 9.8 g. (0.1 mol) of sulfuric acid in 50 cc. of ethanol was added. The reaction mixture was well stirred and was then evaporated to dryness in vacuo yielding 3-hydroxymethylpyrazole sulfate as a crystalline residue.

The hydrochloric, nitric, sulfamic, phosphoric, acetic, citric, lactic, maleic, tartaric, salicylic, ascorbic, succinic and benzoic acid addition salts of 3-hydroxymethylpyrazole are prepared by substantially the same procedure as described above.

I claim:

1. A compound of the group consisting of 3-hydroxymethylpyrazole and its acid addition salts.
2. 3-hydroxymethylpyrazole.
3. 3-hydroxymethylpyrazole hydrochloride.
4. 3-hydroxymethylpyrazole sulfate.
5. 3-hydroxymethylpyrazole picrate.

REUBEN G. JONES.

No references cited.